United States Patent [19]
Kawai

[11] 4,001,565
[45] Jan. 4, 1977

[54] DIGITAL INTERPOLATOR
[75] Inventor: Hisasi Kawai, Toyohashi, Japan
[73] Assignee: Nippon Soken, Inc., Nishio, Japan
[22] Filed: May 20, 1975
[21] Appl. No.: 579,159
[30] Foreign Application Priority Data
June 25, 1974 Japan .............................. 49-72939
[52] U.S. Cl. ................................................. 235/152
[51] Int. Cl.² ........................................ G06F 15/34
[58] Field of Search .............. 235/152, 150.53, 197
[56] References Cited
UNITED STATES PATENTS

| | | | |
|---|---|---|---|
| 3,617,716 | 11/1971 | Schulz ................................. | 235/152 |
| 3,676,655 | 7/1972 | Ancona .............................. | 235/152 |
| 3,748,447 | 7/1973 | Hajicek et al. ..................... | 235/152 |
| 3,789,203 | 1/1974 | Catherall et al. ................... | 235/152 |
| 3,813,529 | 5/1974 | Bartlett ............................... | 235/152 |
| 3,821,524 | 6/1974 | Wahl .................................. | 235/197 |
| 3,846,625 | 11/1974 | Sasayama ........................... | 235/152 |
| 3,862,404 | 1/1975 | Fiedrich ............................. | 235/152 |

Primary Examiner—Charles E. Atkinson
Attorney, Agent, or Firm—Cushman, Darby & Cushman

[57] ABSTRACT

A digital interpolator in which a value previously stored in a program memory circuit such as an ROM is read out by addressing it with an output of a counter having a predetermined value preset therein, the value read out is accumulated in an accumulator, a control circuit controls the supply of N-1 or N clock pulses to the accumulator and the counter, and the digits in the output of the accumulator which digits are ones located at the digit position whose figure is equal to the exponent of a radix number for operation to denote N and greater digit positions are stored in another memory circuit, whereby the output of the program memory circuit is divided by N and an interpolated value is determined by digital proportional division technique.

7 Claims, 7 Drawing Figures

DIGITAL INTERPOLATOR

BACKGROUND OF THE INVENTION

The present invention relates to a digital interpolator for determining a value between two known points by digital proportional division technique.

Heretofore, when a program memory, such as a read-only memory (ROM), of a limited capacity is used with an output of the ROM being $f(X)$ for an address X of the ROM, it is often desired to determine by interpolation the $f(X)$ for a value X which is between $X_1$ and $X_2$, with $f(X_1)$ and $f(X_2)$ being known values. In such a case, the $f(X)$ may be derived from the arithmetic operation of $$\frac{f(X_2) - f(X_1)}{X_2 - X_1} \times (X - X_1) + f(X_1) .$$

Since the operation includes a multiplication operation as well as a division operation, the operation speed is slow and the circuit configuration becomes complex because a number of adders, accumulators, registers, etc. are required.

SUMMARY OF THE INVENTION

According to the present invention, in order to overcome the above difficulties, a digital interpolator which has a high operating speed and a simple circuit configuration is provided, in which a value which has been previously programmed in a program memory circuit such as a read-only memory is read out by addressing it with a content of a counter having a predetermined count preset therein, and the value thus read out is accumulated in an accumulator while a control circuit supplies (N−1) or N clock pulses to the accumulator and the counter, and the output of the program memory circuit is divided by N by storing the digits which are at the digit position whose figure is equal to the exponent for a radix number for the operation to denote N and greater digit positions of the output of the accumulator, whereby an interpolated value may be determined by digital proportional division technique. It is, therefore, an object of the present invention to provide a digital interpolator which has a high operating speed and a simple circuit configuration.

The above and other objects, features and advantages of the present invention will become more apparent from the following detailed description of the preferred embodiments of the present invention when read in connection with the accompanying drawings.

DESCRIPTION OF THE PREFERRED EMBODIMENTS

The embodiments of the present invention will now be explained with reference to the drawings.

Figure 1:
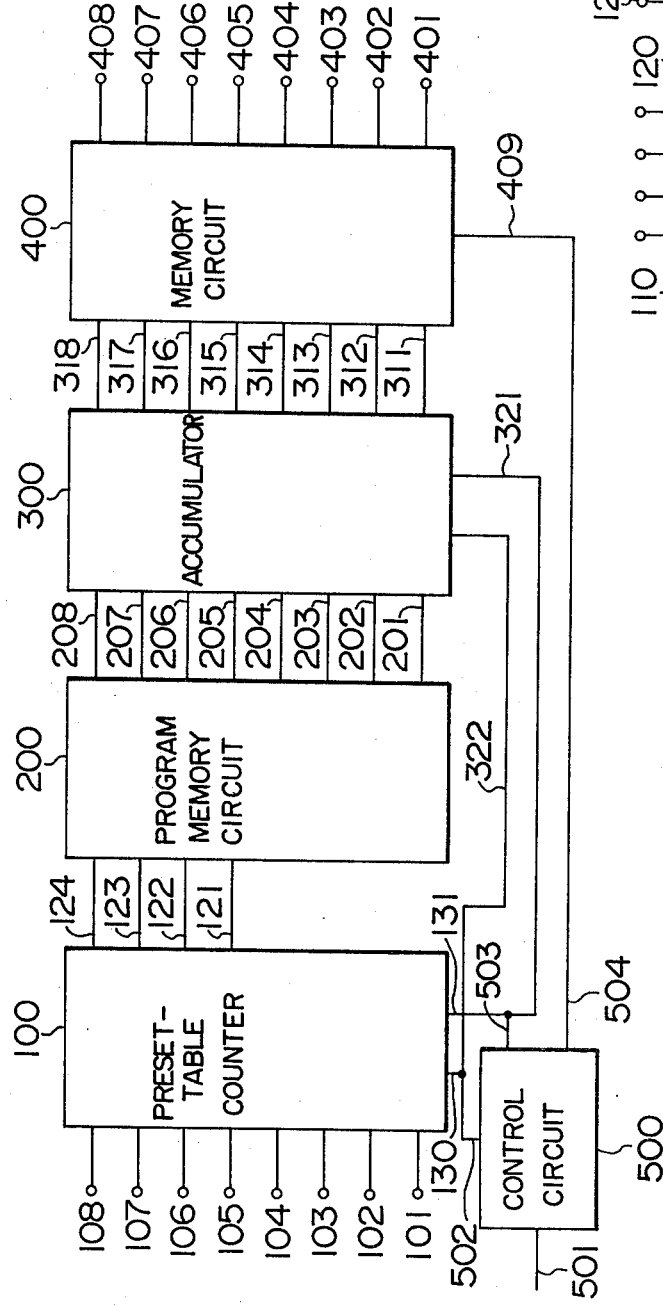
FIG. 1 is a block diagram showing an embodiment of an overall arrangement of the apparatus in accordance with the present invention.
Figure 2:
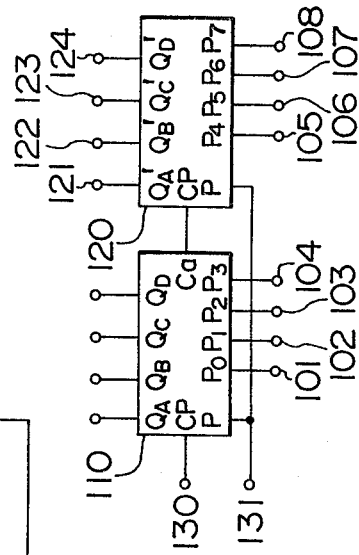
FIG. 2 is a block diagram showing a presettable counter used in the apparatus shown in FIG. 1.
Figure 3:
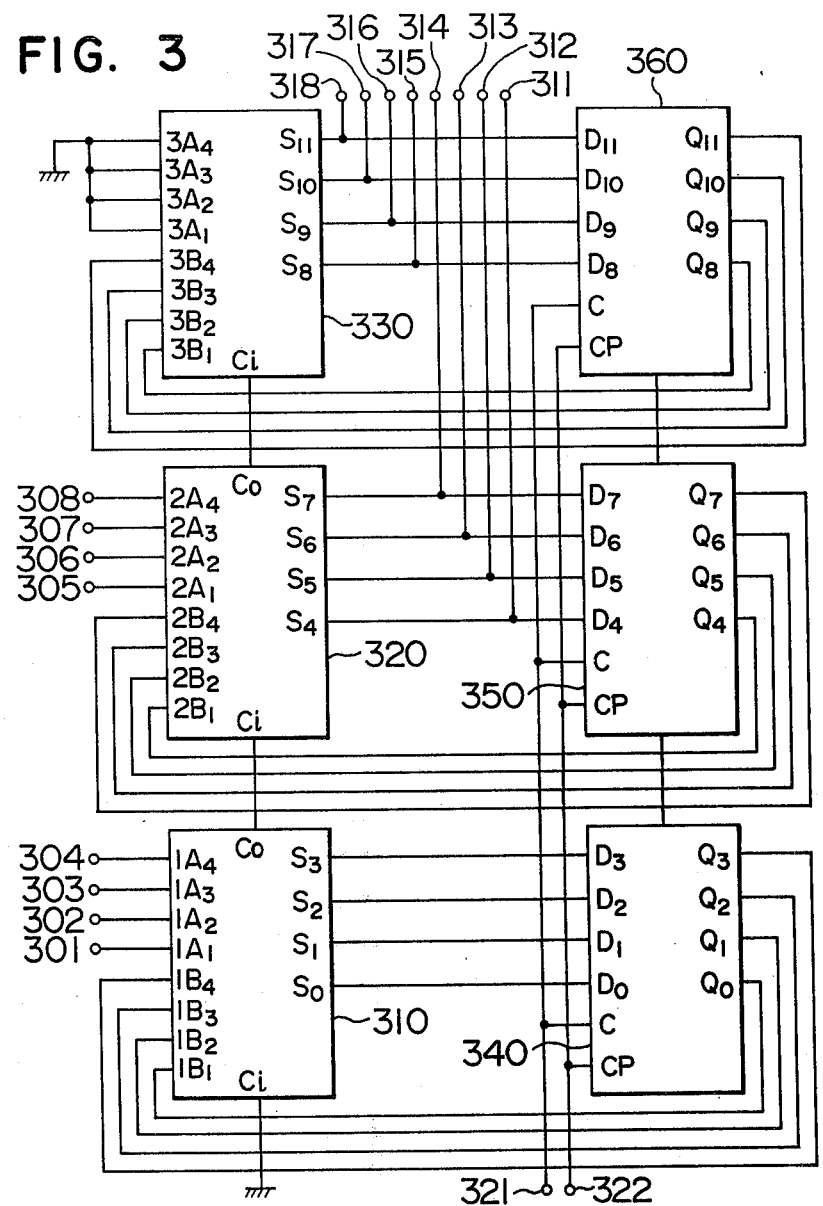
FIG. 3 is a block diagram showing an embodiment of an accumulator used in the apparatus shown in FIG. 1.
Figure 4:
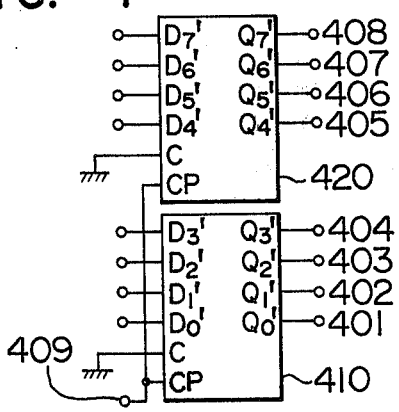
FIG. 4 is a block diagram showing an embodiment of a memory circuit used in the apparatus shown in FIG. 1.
Figure 5:
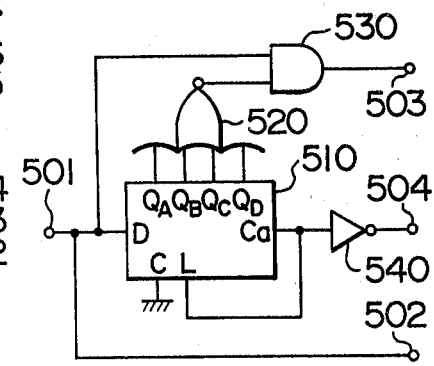
FIG. 5 is an electrical circuit diagram showing an embodiment of a control circuit used in the apparatus shown in FIG. 1.
Figure 6:
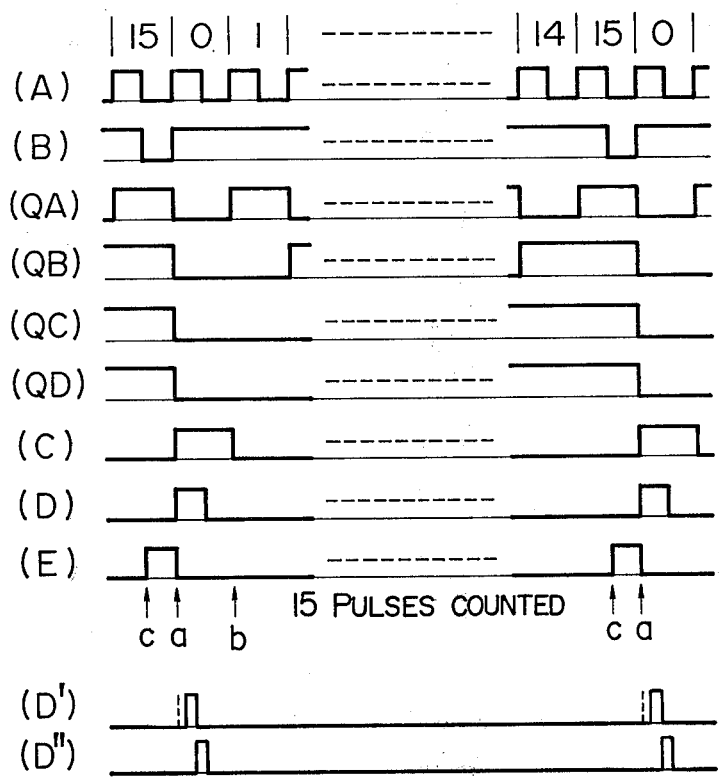
FIG. 6 shows signal waveforms for illustrating the operation of the control circuit shown in FIG. 5.

Referring to FIG. 1 which shows an embodiment of a digital interpolator of the present invention, 100 designates an eight-bit presettable counter, the circuit configuration of which is shown in FIG. 2, in which 110 and 120 designate presettable counters, which are in the illustrated embodiment SN74193 manufactured by Texas Instruments Corp. (TI), U.S.A. A clock input Cp of the counter 110 is connected to an input terminal 130 while a carry output terminal Ca is connected to a clock input Cp of the counter 120. The preset enable terminals P of the counter 110 and 120 are connected in common to an input terminal 131. The data input terminals $P_0$, $P_1$, $P_2$, $P_3$ of the counter 110 and the data input terminals $P_4$, $P_5$, $P_6$, $P_7$ of the counter 120 are connected to the input terminals 101, 102, 103, 104 and the input terminals 105, 106, 107, 108, respectively. The counter 110 also includes output terminals $Q_A$, $Q_B$, $Q_C$, $Q_D$ while the counter 120 includes output terminals $Q_A'$, $Q_B'$, $Q_C'$, $Q_D'$ which are connected to the output terminals 121, 122, 123, 124, respectively. The signals are appearing on the data input terminals $P_0$, $P_1$, $P_2$, $P_3$, $P_4$, $P_5$, $P_6$, $P_7$ and the output terminals $Q_A$, $Q_B$, $Q_C$, $Q_D$, $Q_A'$, $Q_B'$, $Q_C'$, $Q_D'$ are all in binary code, $Q_A$ being a least significant bit with the bits ascending in the order of $Q_B$, $Q_C$, $Q_D$, $Q_A'$, $Q_B'$, $Q_C'$, $Q_D'$. 200 designates a program memory circuit of four-bit input and eight-bit output, which in the illustrated embodiment consists of two HPROM 8256 manufactured by Harris Corp., U.S.A. The four input terminals for four bits are connected to the terminals 121, 122, 123 and 124, respectively. The output of one of the ROM's is produced sequentially from the output terminals 201, 202, 203 and 204 in the ascending digit order while the output of the other ROM is produced sequentially from the output terminals 205, 206, 207 and 208 in the ascending digit order. 300 designates an accumulator the circuit configuration of which is shown in FIG. 3, in which 310, 320 and 330 designate parallel binary adders, which are in the illustrated embodiment SN7483 manufactured by TI. A carry input Ci of the adder 310 is grounded, a carry output Co thereof is connected to a carry input Ci of the adder 320 and a carry output Co of the adder 320 is connected to a carry input Ci of the adder 330. One of the bit-parallel inputs to the adder 310 is applied to the input terminals $1A_1$, $1A_2$, $1A_3$, and $1A_4$ in the ascending digit order while the other input is applied to the input terminals $1B_1$, $1B_2$, $1B_3$ and $1B_4$ in the ascending digit order. A sum output of the two parallel inputs is produced at the output terminals $S_0$, $S_1$, $S_2$ and $S_3$ in the ascending digit order. Similarly, in the adder 320, one of the parallel inputs is applied to the input terminals $2A_1$, $2A_2$, $2A_3$ and $2A_4$ while the other input is applied to the input terminals $2B_1$, $2B_2$, $2B_3$ and $2B_4$, and a sum output of the two parallel inputs is produced at the output terminals $S_4$, $S_5$, $S_6$ and $S_7$. Similarly, in the adder 330, one of the parallel inputs is applied to the input terminals $3A_1$, $3A_2$, $3A_3$ and $3A_4$ while the other one of the inputs is applied to the input terminals $3B_1$, $3B_2$, $3B_3$ and $3B_4$, and a sum output of the two parallel inputs is produced at the output terminals $S_8$, $S_9$, $S_{10}$ and $S_{11}$. Since the input terminals $3A_1$, $3A_2$, $3A_3$ and $3A_4$ are grounded, the input thereto is zero. 340, 350 and 360 designates memory circuits for storing respective inputs thereto in response to the rise of a clock pulse applied to a terminal 322. The respective four input terminals of the memory circuits are connected to the corresponding outputs of the adders 310, 320 and 330, respectively. That is, the output terminal $S_0$ of the adder 310 is connected to an input terminal $D_0$ of the memory circuit 340, the output terminal $S_1$ to an input terminal $D_1$, the output terminal $S_2$ to an input terminal $D_2$, the output terminal $S_3$ to an input terminal $D_3$, the output terminal $S_4$ of the adder 320 is connected to an input terminal $D_4$ of the memory 350, the output terminal $S_5$ to an input terminal $D_5$, the output terminal $S_6$ to an input terminal $D_6$, the output terminal $S_7$ to an input terminal $D_7$, and the output terminal $S_8$ of the adder 330 is connected to an input terminal $D_8$ of the memory 360, the output terminal $S_9$ to an input terminal $D_9$, the output terminal $S_{10}$ to an input terminal $D_{10}$, the output terminal $S_{11}$ to an input terminal $D_{11}$. The clear inputs C and the clock inputs $C_P$, respectively, of the memory circuits 340, 350 and 360 are connected in common to the input terminals 321 and 322. The memory circuits 340, 350 and 360 include the output terminals $Q_0$, $Q_1$, $Q_2$, $Q_3$, $Q_4$, $Q_5$, $Q_6$, $Q_7$, $Q_8$, $Q_9$, $Q_{10}$ and $Q_{11}$, which correspond to the input terminals $D_0$, $D_1$, $D_2$, $D_3$, $D_4$, $D_5$, $D_6$, $D_7$, $D_8$, $D_9$, $D_{10}$ and $D_{11}$, respectively. The output terminals $Q_0$, $Q_1$, $Q_2$, and $Q_3$ of the memory circuit 340, the output terminals $Q_4$, $Q_5$, $Q_6$ and $Q_7$ of the memory circuit 350, and the output terminals $Q_8$, $Q_9$, $Q_{10}$ and $Q_{11}$ of the memory circuit 360 are connected, respectively, to the input terminals $1B_1$, $1B_2$, $1B_3$ and $1B_4$ of the adder 310, the input terminals $2B_1$, $2B_2$, $2B_3$ and $2B_4$ of the adder 320, and the input terminals $3B_1$, $3B_2$, $3B_3$ and $3B_4$ of the adder 330. The input terminals $D_4$, $D_5$, $D_6$, $D_7$, $D_8$, $D_9$, $D_{10}$ and $D_{11}$ of the memory circuits 350 and 360 are connected to the output terminals 311, 312, 313, 314, 315, 316, 317 and 318. In the illustrated embodiment, the memory circuits 340, 350 and 360 each consist of SN74173 manufactured by TI Corp. 400 designates an eight-bit input, eight-bit output memory circuit which is constructed in a similar manner to the memory circuits in the accumulator 300. It comprises two memory circuits 410 and 420 as shown in FIG. 4, each consisting of SN74173 manufactured by TI. The input terminals $D_0'$, $D_1'$, $D_2'$ and $D_3'$ of the memory circuit 410 are connected to the output terminals 311, 312, 313 and 314, respectively, of the accumulator 300. The input terminals $D_4'$, $D_5'$, $D_6'$ and $D_7'$ of the memory circuit 410 are connected in the same way to the output terminals 315, 316, 317 and 318 of the accumulator 300. The input terminals $D_0'$, $D_1'$, $D_2'$, $D_3'$, $D_4'$, $D_5'$, $D_6'$ and $D_7'$ correspond to the output terminals $Q_0'$, $Q_1'$, $Q_2'$, $Q_3'$, $Q_4'$, $Q_5'$, $Q_6'$ and $Q_7'$, respectively, which are in turn connected to the output terminals 401, 402, 403, 404, 405, 406, 407 and 408. The clock input terminals Cp of the memory circuits 410 and 420 are connected in common to an input terminal 409 and the clear terminals C thereof are grounded. 500 designates a control circuit which supplies control signals to the presettable counter 100, the accumulator 300 and the memory circuit 400, the circuit configuration of which is shown in FIG. 5, in which 510 designates a four-bit binary counter which is in the illustrated embodiment SN74193 manufactured by TI, a clear terminal C thereof being grounded and a carry output terminal Ca thereof being connected to a load terminal L. Output terminals are designated as $Q_A$, $Q_B$, $Q_C$ and $Q_D$ in ascending digit order. 520 designates a four-bit NOR gate which NORs the output terminals $Q_A$, $Q_B$, $Q_C$ and $Q_D$ of the counter 510. 530 designates an AND gate which ANDs the input terminal 501 to which a clock pulse is applied and an output of the NOR gate 520. 540 designates an inverter which inverts a carry output of the counter 510. In the above circuit configuration the control circuit 500 operates in the following manner: When an input terminal 501 of the control circuit 500 receives a clock pulse train as shown in FIG. 6(A), the binary counter 510 produces a pulse at its carry output terminal Ca between the fifteenth and sixteenth clock pulses after the counter 510 initiated to count, as shown in FIG. 6(B). That is, the counter 510 produces a carry output every time when 16 clock pulses are counted, therefore, the counter 510 functions as a hexa-decimal counter. The outputs at the output terminals $Q_A$, $Q_B$, $Q_C$ and $Q_D$ of the counter 510 produce the waveforms as shown in FIG. 6 $(Q_A)$, $(Q_B)$, $(Q_C)$ and $(Q_D)$ and the output of the NOR gate 520 produces a waveform as shown in FIG. 6(C). By applying the waveform of FIG. 6(C) and the clock pulse train to the AND gate 530 an output waveform as shown in FIG. 6(D) is produced at the output of the AND gate 530. A carry output of the counter 510 is supplied to the inverter 540 to obtain a waveform as shown in FIG. 6(E). The output terminals 502, 503 and 504 of the control circuit 500 are connected to the input terminal 501, the output terminal of the inverter 540 and the output terminal of the AND gate 530, respectively. The output terminal 502 of the control circuit 500 is connected to the input terminal 130 of the presettable counter 100 and to the input terminal 322 of the accumulator 300, while the output terminal 503 of the control circuit 500 is connected to the input terminal 131 of the presettable counter 100 and to the input terminal 321 of the accumulator 300, and the output terminal 504 of the control circuit 500 is connected to the input terminal 409 of the memory circuit 400.

The operation of the present apparatus thus constructed will now be described. At a time point a shown in FIG. 6, when the presettable counter 100 receives a preset signal shown in FIG. 6(D) at its input terminal 131, it reads in the values of binary codes at the input terminals 101 to 108. Then, at the time point b shown in FIG. 6, the presettable counter 100 starts to count the clock pulse train shown in FIG. 6(A) applied to the input terminal 501 starting from the value it has read in. For the sake of description, assuming that the value X to be read in is the code "10111001", the output of the presettable counter 100 is incremented for each clock pulse to the value "10111001 + 15 (decimal) = 11001000" after it starts to count and cleared by the signal shown in FIG. 6(D), until the next value is read in. Now considering the output of the ROM 200 whose input address is given by upper four digits of the output of the presettable counter 100, the input address at the time point a shown in FIG. 6 is "1011", and since the upper four digits of the output of the presettable counter 100 do not change for six clock pulse inputs, at which time the output exhibits "10111111", and the input address to the ROM 200 remains as 1011. On the occurrence of the seventh clock pulse, the output of the presettable counter 100 changes to "11000000" and the input address to the ROM 200 is incremented by one to "1100". Since a total of 15 clock pulses are applied, the output of the presettable counter 100 is finally changed to "11001000" and the input address to the ROM 200 remains at 1100 for the additional nine clock pulses applied after the seventh clock pulse. Assuming that the apparatus is programmed such that the ROM 200 produces an output $f(X_1)$ for an input address 1011 and produces an output $f(X_2)$ for an input address 1100, the ROM 200 produces the output $f(X_1)$ for the clock pulses from zero to sixth and the output $f(X_2)$ for the clock pulses from seventh to fifteenth, in binary code.

In the accumulator 300, assuming that the input values at the input terminals 301 to 308 of the adders 310 and 320 are A, and the outputs of the memory circuits 340, 350 and 360 are B, then the outputs of the adders 310, 320 and 330 are represented by A + B. Assuming that the input A is constant, the memory circuits 340, 350 and 360 are all cleared by the waveform of FIG. 6(D) so that the outputs thereof are "0". Since the outputs of the memory circuits 340 and 350 are 0 if no clock pulse is applied to the input terminal 322 after the memory circuits have been cleared, the outputs of the adders 310, 320 and 330 are A + 0. When one clock pulse is applied to the input terminal 322, the outputs of the adders 310, 320 and 330 produce $A + A + 0 = 2A$ because the memory circuits 340, 350 and 360 store $A + 0$ at the rise of the clock pulse and output the stored value. At the second clock pulse, the outputs of the adders 310, 320 and 330 change to $A + 2A = 3A$. In this manner, when 15 clock pulses are received, the outputs of the adders 310, 320 and 330 change to $A + 15A = 16A$. Now considering the relationship between the output of the ROM 200 and the input of the accumulator and the clock pulse, the $f(X_1)$ is applied to the input of the accumulator 300 and hence to the inputs of the adders 310, 320 and 330 until six clock pulses are applied, and after application of seven clock pulses until nine clock pulses are applied the $f(X_2)$ is applied to the afore-mentioned inputs, thus, the input terminals $D_0$ to $D_{11}$ of the memory circuits 340, 350 and 360 receive the value $7 \times f(X_1) + 9 \times f(X_2)$ at the time point C shown in FIG. 6. The memory circuit 400 then stores the value at the upper digit input terminals $D_4$ to $D_{11}$ of the input terminals $D_0$ to $D_{11}$ of the memory circuits 340, 350 and 360 at the rise of the waveform of FIG. 6(E), that is, at the time point C shown in FIG. 6, and outputs the stored value at the output terminals 401 to 408. Since the selection of the upper digit output terminals $D_4$ to $D_{11}$ of the memory circuits 340, 350 and 360 is equivalent to the division of the outputs $D_0$ to $D_{11}$ represented by binary code by 16, it follows that the output of the memory circuit 400 has the value $$\frac{7 \times f(X_1) + 9 \times f(X_2)}{16}.$$

Figure 7:
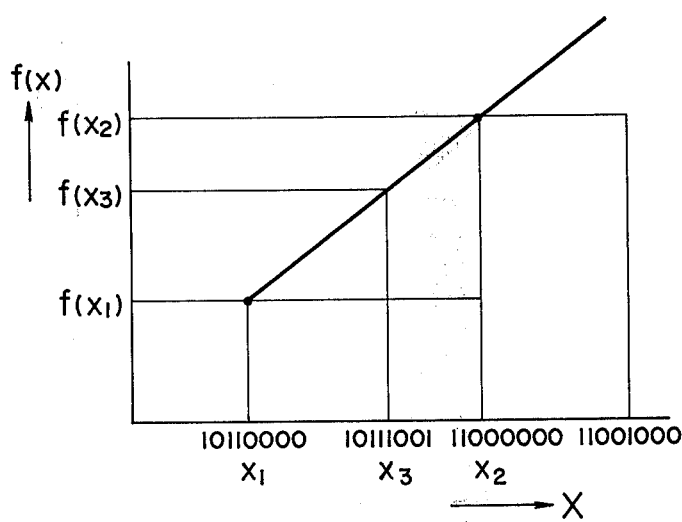
FIG. 7 shows an input-output characteristic for illustrating the operation of the apparatus shown in FIG. 1.

The relationship between the input value X of the presettable counter 100 and the output $f(X)$ of the ROM 200 is shown in FIG. 7, in which an abscissa represents the X and an ordinate represents the $f(X)$, $f(X)$ being $f(X_1)$ when X is "10110000", and $f(X_2)$ when X is 11000000. The distance between $X_2$ and $X_1$ is $11000000 - 10110000 = 10000 = 16$ (decimal) while the distance between $X_3$ and $X_1$ is $10111001 - 10110000 = 1001 = 9$ (decimal). A value $f(X_3)$ for $X_3$ is obtained from the two known values $f(X_1)$ and $f(X_2)$ by the formula $$f(X_3) = \frac{f(X_2) - f(X_1)}{X_2 - X_1} \times (X_3 - X_1) + f(X_1),$$

by making use of proportional division technique. This is expressed as follows.

$$f(X_3) = \frac{f(X_2) - f(X_1)}{16} \times 9 + f(X_1) = \frac{9 \times f(X_2) + 7 \times f(X_1)}{16}.$$

This expression corresponds to the value of the output of the memory circuit 400. In an alegebraical procedure, assuming that X defines a point between $X_1$ and $X_2$ dividing the distance therebetween by the ratio m : n and m and n are defined by $X_2 - X_1 = m + n$, then the $f(X)$ for X is given by $$f(X) = \frac{f(X_2) - f(X_1)}{m + n} \cdot m + f(X_1) = \frac{nf(X_1) + mf(X_2)}{m + n} \quad (1).$$

On the other hand, in the present apparatus, the control circuit 500 produces $(m + n - 1)$ clock pulses, which are counted one by one by the presettable counter 100 starting from X to the count $X + m + n - 1$. At the same time, in the accumulator 300 connected to the output terminal of the ROM 200, the output of the ROM 200 is accumulated for each clock pulse to produce the accumulation $(m + n - 1)$, and the digits which are located at the digit position whose figure is equal to the exponent of a radix number for operation to denote $m+n$ and greater digit positions are taken. Thus, the following operation is executed.

$$[f(X) + f(X + 1) + \ldots + f(X + n - 1) + f(X + n) + f(X + n + 1) + \ldots + f(X + m + n - 1)] \div (m + n) \quad (2)$$

In the equation (2), for n clock pulses from $f(X)$ to $f(X + n - 1)$, the output of the ROM 200 produces $f(X_1)$ while for m clock pulses from $f(X + n)$ to $f(X + m + n - 1)$, the output of the ROM 200 produces $f(X_2)$. Thus the equation (2) can be represented as $$\frac{nf(X_1) + mf(X_2)}{m + n},$$

which is identical to the equation (1). Accordingly, with the present circuit configuration, when X between $X_1$ and $X_2$ is given, the $f(X)$ for the X can be obtained by adding the output of the ROM for the $(X + m + n - 1)$ count and taking the digits which are located at the digit position whose figure is equal to the exponent of a radix number for operation to denote N and greater digit positions. Thus, m and n need not be individually obtained. When $m + n$ is chosen to 10 or 100 in decimal form and $2^n$ in binary form the interpolation can be simplified.

Where a conventional non-presettable counter is replaced for the presettable counter 100 and the conventional counter is adapted to count external control signals and the count thereof is applied as the input address of the ROM 200, the interpolation can be executed by interrupting the external control signals for a given interval and introducing $(m+n-1)$ clock pulses during that interval to increment the output of the counter by $(m+n-1)$.

Although only a counting up of the $(m+n-1)$ pulses is described in the above example, it is apparent from the present circuit configuration that the interpolation can also be made by counting down. The adders 310, 320 and 330 in the accumulator are replaced by subtractors, and the input address of the ROM 200 and the value to be programmed are shifted in order to equally perform the interpolation through counting down.

Although the ROM 200 was used as a program memory circuit in the above example, any other memory circuit which permits programming the given values may be used as the program memory circuit.

Further, while the input terminals $D_4$ to $D_{11}$ of the memory circuits 350 and 360 were used as the output terminals of the accumulator 300 in the above example, by changing the arrangement of the control circuit 500 shown in FIG. 5 such that the waveforms as shown in FIGS. 6(D') and (D''), the durations of which are shorter than that of the waveform shown in FIG. 6(D), are produced, and applying them to the input terminal 409 of the memory circuits 410 and 420 shown in FIG. 4 and the input terminal 321 of the memory circuits 340, 350 and 360, the outputs $Q_4$ to $Q_{11}$ of the memory circuits 350 and 360 may be directly used as the output terminals 311 to 318 of the accumulator 300. In this case, since 16 clock pulses are applied after the memory circuits 340, 350 and 360 have been cleared by the signal of FIG. 6(D''), the operation is such that by means of N clock pulses the above equation (1) is met.

As described hereinabove, according to the apparatus in accordance with the present invention, the input of the ROM is connected to the output of the counter having a preset value or precounted value therein to determine the address of the ROM, the output of the ROM is connected to the input of the accumulator consisting of the adder and the memory circuit, and the control circuit causes the $(N-1)$ or N clock pulses to be supplied to the counter and the accumulator, and the digits of the output of the accumulator which are located at the digit position whose figure is equal to the exponent of a radix number for operation to denote N and greater digit positions are connected to the input of additional memory circuit, whereby the difference between two outputs of the ROM is divided by N and an interpolated value is determined in digital proportional division technique. Thus, the present invention offers an advantage in that it permits the determination of an interpolated value at a high operating speed with a simple circuit configuration.

What is claimed is:

1. A digital interpolator for determining $f(X)=y$ for a value of $X_1 < X < X_2$ and $X-X_1=n$ and $X_2-X=m$ where $f(X_1)=Y_1$ and $f(X_2)=Y_2$ are known values comprising a counter (100) having inputs of the variable X and a clock pulse input with the output of said counter changing in proportion to the number of clock pulses, a program memory circuit (200) connected to said counter and addressed by an output of said counter for repeated selective readout of predetermined program values of $f(X_1)$ and $f(X_2)$ in response to clock pulses, an accumulator (300) connected to said program memory circuit for accumulating the output of said program memory circuit, a control circuit (500) connected to said accumulator and said counter for supplying a predetermined number of clock pulses to each of them, said accumulator accumulating a value of $n \cdot f(X_1) + m \cdot f(X_2)$ after said predetermined number of clock pulses, and a memory circuit (400) connected to said accumulator for storing the output digits of said accumulator which are at and higher than Nth digit position where $A^N=n+m$ and A is the radix of the number system utilized, whereby the output of said program memory circuit is divided by $N=n+m$ so that an interpolated value $$f(X) = \frac{n \cdot f(X_1) + m \cdot f(X_2)}{n+m}$$

is determined by a digital proportional division technique.

2. A digital interpolator according to claim 1, where said predetermined number of clock pulses is $N=n+m$.

3. A digital interpolator according to claim 1, wherein said predetermined number of clock pulses is $N-1 = m+n-1$.

4. A digital interpolator for determining $f(X)=y$ for a value of $X_1 < X < X_2$ and $X-X_1=n$ and $X_2-X=m$ where $f(X_1)=Y_2$ and $f(X_2)=Y_2$ are known values comprising a counter (100) the output of which is changed depending on the number of clock pulses applied to an input thereof, a program memory circuit (200) connected to said counter and addressed by an output of said counter for making repeated selective readout of predetermined programmed values of $f(X_1)$ and $f(X_2)$ in response to clock pulses, an accumulator (300) connected to said program memory circuit for accumulating the output of said memory circuit in synchronism with said clock pulses, a control circuit (500) connected to said accumulator and said counter for controlling the number of the clock pulses to be applied to each of them to a predetermined number, said accumulator accumulating a value of $n \cdot f(X_1)+m \cdot f(X_2)$ after said predetermined number of clock pulses, and a memory circuit (400) connected to said accumulator for storing the output digits of said accumulator which digits are ones at Nth and greater digit positions where $A^N=n+m$ and A is the radix of the number system utilized, whereby the output of said program memory circuit is divided by $N=n+m$ so that an interpolated value $$f(X) = \frac{n \cdot f(X_1) + m \cdot f(X_2)}{n+m}$$

is determined by a digital proportional division technique.

5. A digital interpolator according to claim 4, wherein said accumulator (300) comprises parallel adders (310, 320, 330) each being for adding two inputs together, and memory circuits (340, 350, 360) each having its input connected to the output of each corresponding one of said adders respectively, one of said two inputs to said parallel adders is connected to the output of said program memory circuit (200), while the output of said memory circuits (340, 350, 360) are fed back to the other one of said two inputs.

6. A digital interpolator according to claim 4, wherein said predetermined number of clock pulses is $N=n+m$.

7. A digital interpolator according to claim 4, wherein said predetermined number of clock pulses is $N-1=m+n-1$.

* * * * *